Patented May 23, 1950

2,508,533

UNITED STATES PATENT OFFICE 2,508,533

TAPIOCA PROCESS

Aksel G. Olsen, Summit, N. J., assignor to General Foods Corporation, New York, N. Y., a corporation of Delaware No Drawing. Application August 9, 1945,
Serial No. 609,935

6 Claims. (Cl. 127—32)

This invention relates to products made from tapioca or similar starch for subsequent use in making puddings and to a process of producing such products.

The usual procedure in preparing tapioca starch for use in puddings is to wet the starch with a limited amount of water and to heat or cook it to the degree of gelatinization desired. The swollen masses, called "flake," are dried to the moisture level desired and then ground and separated into different mesh sizes by screening, after which the different mesh sizes are combined in suitable proportions to produce a final product of the desired granulation.

While the above procedure has been widely used for a long time, yet it has definite and well known disadvantages. One is the difficulty of controlling the cooking of the starch so that all of it in the final product is at the proper stage of gelatinization to provide the desired pudding texture when the ultimate pudding is prepared by the consumer according to a set recipe. If some of the starch is undercooked, the pudding is made too thick and pasty, whereas the effect of overcooking some of the starch is to make the pudding too gummy or coherent.

Another difficulty is that too much of the dried flake is ground to the finer mesh sizes. The use of such fines has been necessary because of their thickening effect which minimizes settling of the large particles characteristic of such puddings. The amount of fines required for proper pudding texture depends on the relative proportions of the coarser screen fractions employed in the product, but will always be considerable and is generally of the order of 35% on a weight basis. The amount used, however, must be kept below a certain limit to avoid undue thickening and it is difficult to control grinding so as to produce only the desirable amount of fines and no more. The excess unused fines accordingly represent an economic loss.

Moreover, the presence of the large amount of fines required for proper pudding texture creates a further problem of segregation in the package. Merchandizing conditions make it desirable for each package to contain enough to prepare several puddings, in which case segregation of fines may cause variations in the quality of the puddings.

I have found that fines produced by grinding the dried flake can be agglomerated into larger porous particles by the process described hereinafter and that the use of these porous agglomerates in tapioca puddings not only eliminates the difficulties mentioned above, but has other advantages due to the distinctive properties of the agglomerates. For example, the agglomerates produced by my process may be of substantially the same size as the larger mesh sizes now produced in grinding the dried flake, but their porous nature permits them to absorb moisture very rapidly and hence to cook more quickly. For the same reason they are much less dependent on uniform pregelatinization of the starch for proper pudding texture, so that the use of a standard recipe in preparing the finished pudding yields uniform results irrespective of reasonable variations in the degree of pregelatinization. There is no loss of fines by my process of agglomeration. If desired, the fines remaining after agglomeration (largely composed of material which has been agglomerated to an extent insufficient to produce particles exceeding the size of the largest particles present in the original fines) can be removed by screening and added to the original fines for reagglomeration though, by proper control of the factors to be hereinafter discussed on which agglomeration depends, the percentage of material small enough to constitute fines can be so reduced as to be left in the product without deleterious effect on the puddings due to segregation in the package. Though possessing sufficient strength to resist breaking up in the package, the agglomerates have very much the same thickening effect on the puddings as may be obtained by the addition of fines. That is, most of the fines making up the agglomerates swell rapidly into unitary masses because of their porosity and the ready access of cooking water to their interiors, forming more or less translucent, globular masses that characterize such puddings. However, the outer fines "cook out" to provide the desired thickening effect and maintain these masses in suspension. In fact, the thickening effect produced is greater than can be realized by the addition of fines because of the limitation imposed by segregation in the package.

The agglomerates (with or without the aforementioned small percentage of fines) may thus be used alone for the production of puddings of the consistency desired, or they may be used in admixture with the coarser particles obtained in the usual grinding of flake, say, one part of these coarser flake particles to two parts of the agglomerates, without impairing pudding texture. Similarly, the agglomerates may be made from fines resulting from the usual grinding of flake, or the entire dried flake may be ground into fines and made up into agglomerates. For these purposes the fines should be ground at least to 14 mesh particles, since larger particles are difficult to agglomerate and the agglomerates lose much of their useful properties. Preferably the agglomerates are produced from particles small enough to pass through a 20 mesh screen, although there is no limit on the degree of fineness of the particles beyond this point.

It appears that the desired porous structure of these agglomerates is dependent on the presence of irregularly shaped particles of ground flake, which although small are macroscopic in size, and on the fact that these particles are hydrated only enough to cause them to stick firmly together in a porous structure, but without absorbing sufficient moisture to cause them to swell into continuous, non-porous lumps or masses. Besides being necessary to provide the properties required for the preparation of puddings from the product, pregelatinization of the starch is also necessary in order to obtain the porous agglomerates. It has been proposed heretofore to treat raw starch with moisture and heat while agitating to produce small, dense lumps or pellets. In such cases the degree of gelatinization is limited so that the pellets will break down and disintegrate readily in water, but if such processes were applied to waxy starch and if gelatinization were carried far enough, dense pellets of partially cooked starch would be produced that would be more or less equivalent to ordinary pearl tapioca. On the other hand, pregelatinization followed by drying and grinding provides the small irregularly shaped particules required at the start of the process. Also the fact that the starch has been gelatinized enables it to absorb moisture rapidly at the surface of the particles, without heating, so that the particles can be bonded together without substantial swelling and the desired porous structure thus obtained.

The fines to be agglomerated can be obtained by any procedure which will provide dried gelatinized starch particles of suitable size. For example, raw starch containing about 50% moisture is cooked for 15 to 20 minutes at a temperature of 150 to 160° F., and the gelatinized mass or "flake" subsequently dried to about 12% moisture, these being the cooking and drying operations now generally used in the production of granular products for subsequent pudding making. The dried flake may then be ground wholly to particles small enough to pass a 14-mesh screen, or into various mesh sizes for recombination into the usual product, with an excess of fines (generally passing 20-mesh).

Agglomeration of the ground particles is carried out by adding water as explained in detail hereinafter and stirring or otherwise agitating to break up excessive massing and prevent undue clumping. The size of the agglomerates will depend to some extent on the method of addition of the water as explained below and on the size of the original particles, and also on the type of stirring or agitating element and the type of movement which it describes with respect to the particles. However, the size of the agglomerates can be controlled to a large extent by regulating the speed of operation of the stirring element and the duration of stirring. Increasing the speed of operation of the stirring apparatus tends to keep down the size of the agglomerates, and continuing the stirring operation after the addition of water has been completed causes a reduction in their size.

While agglomeration is preferably carried out with water at ordinary temperatures, it is nevertheless possible to use water at any temperature below that at which further gelatinization of the starch will occur.

In order to obtain agglomerates of porous character, the amount of water added to the ground particles must be limited and its rate of addition regulated. The particles are capable of absorbing several times their weight of water. When they have absorbed as much as an equal weight of water, they tend to swell and form continuous gelatinous masses similar to the original gelatinized flake and, even when the amount of water added is substantially less, the agglomerates tend to clump into sticky masses which are difficult to dry and to separate after drying. For these reasons the amount of water to be used in the present process will ordinarily be limited to about 20–35% as stated below. On the other hand, this limited amount of water can be absorbed very quickly by the particles, and unless the water is added quickly enough it may soak into the interior of the particles without causing enough surface stickiness to accomplish agglomeration.

It is also preferable to add the water in such a way as to distribute it substantially uniformly throughout the mass of particles, although this is not essential. For example, if the predetermined amount of water be placed in a mixing bowl and the mass of ground particles dumped in all at one time, or vice versa, some of the particles receive too much water and form large, soggy, non-porous lumps which can not be broken up by prolonged stirring. Nevertheless a large amount of the desired porous agglomerates is obtained, while the masses referred to can be removed by screening and then dried and reground like ordinary tapioca flake. Hence such procedures are useful, but better results can be achieved by better distribution of the water throughout the mass of particles to be agglomerated.

More uniform distribution can be obtained by spreading the ground particles in a thin layer and showering the area of the layer with the predetermined amount of water, or vice versa, the mass being then collected and stirred to control the extent of agglomeration as described above. A more convenient method, however, is to subject the mass to continuous stirring in a mixing bowl or like device designed to provide maximum surface renewal of the mass, while spraying the surface of the mass with the predetermined amount of water. In this case a maximum rate of water addition should be observed which depends on the efficiency of the mixer with respect to surface renewal of the mass, if substantially uniform distribution of the water throughout the mass is to be secured, but this maximum rate can readily be determined by experience with the aid of the examples given below. This latter type of operation is particularly desirable for large scale production because it may readily be made continuous.

Where substantially uniform distribution of water is obtained, the amount of water desirable for agglomeration lies as stated above between 20 and 35% of the dry material to be agglomerated. An increase in the amount of water either by increasing the rate of water addition or by increasing the period of water addition increases the tendency of agglomeration and decreases the percentage of fines remaining after agglomeration, but results in more surface stickiness between fines and firmer agglomerates with less fines cooking out during pudding preparation. In general, the lower limit of 20% water will be preferred to the upper limit of 35%, though it will be understood that even larger amounts of water can be used, since if some lumps or masses are formed, they can be removed by screening.

The agglomerates may be dried in any appropriate manner, though rapid drying at elevated temperatures (below scorching) is preferred for reasons of economy, as well as to avoid possible spoilage by molds or other organisms. For example, drying may be carried out in 10 to 20 minutes in an ordinary forced draft drier at an air intake temperature of 170 to 200° F. In general, it will be desirable to dry the agglomerates to about 12% moisture, though they may be dried to a lower figure if desired.

If desired, the dried agglomerates may be passed through a suitable screen to remove any clumps formed during drying. Also, the material small enough to constitute fines may be removed by screening and added to the original fines for reagglomeration. However, proper control of the various factors which have been discussed generally results in an agglomerated product in which the percentage of fines will be reduced so as not to substantially exceed approximately 15% and, when so reduced, the fines can be allowed to remain in the product without deleterious effects on the final puddings.

The procedures of the following examples were carried out in a mixing bowl having a variable speed stirring element and a tap water spray directed over the rim of the bowl. Tapioca flake fines of the following mesh analysis were used:

| | Per cent |
|---|---|
| On 20 | 6.0 |
| Through 20 on 25 | 21.0 |
| Through 25 on 30 | 18.0 |
| Through 30 on 40 | 18.0 |
| Through 40 on 60 | 21.0 |
| Through 60 on 100 | 9.5 |
| Through 100 | 6.5 |
| | 100.0 |

In each test, the spray nozzle was adjusted to give a very fine spray of water (at ordinary temperature) and the stirring element operated at second speed (Hobart mixer) throughout the spray-period and subsequent mixing period.

20% water 500 grams of the fines (containing about 12% moisture) were sprayed with 100 grams of water over a period of 2¼ minutes. Thereafter, mixing was continued for 5 minutes to reduce the extent of agglomeration. The agglomerates were then dried to about 12% moisture and screened as follows:

| | Per cent |
|---|---|
| On 6 | 7.2 |
| Through 6 on 20 | 85.2 |
| Through 20 | 7.6 |

The +6 fraction was ground through 6 mesh and added to the other fractions with the resulting mesh analysis:

| | Per cent |
|---|---|
| Through 6 on 8 | 20 |
| Through 8 on 10 | 15 |
| Through 10 on 14 | 26 |
| Through 14 on 20 | 27 |
| Through 20 | 12 |

25% water 500 grams of the fines were sprayed with 125 grams of water over a period of 5 minutes. Thereafter, mixing was continued for 15 minutes to reduce the extent of agglomeration. The agglomerates were then dried to about 12% moisture and screened as follows:

| | Per cent |
|---|---|
| On 6 | 6 |
| Through 6 on 20 | 87 |
| Through 20 | 4 |

The +6 fraction was ground through 6 mesh and added to the other fractions with the resulting mesh analysis:

| | Per cent |
|---|---|
| Through 6 on 10 | 31 |
| Through 10 on 14 | 10 |
| Through 14 on 20 | 50 |
| Through 20 | 9 |

30% water 500 grams of the fines were sprayed with 150 grams of water over a period of 10 minutes. Thereafter, mixing was continued for 22 minutes to reduce the extent of agglomeration. The agglomerates were then dried to about 12% moisture and screened as follows:

| | Per cent |
|---|---|
| On 6 | 3.1 |
| Through 6 on 20 | 82.2 |
| Through 20 | 14.7 |

The +6 fraction was ground through 6 mesh and added to the other fractions with the resulting mesh analysis:

| | Per cent |
|---|---|
| Through 6 on 10 | 16 |
| Through 10 on 14 | 24 |
| Through 14 on 20 | 44 |
| Through 20 | 16 |

In each test, drying was carried out in a Proctor Schwartz drier at an air intake temperature of 180° F. The drying period was approximately 15 minutes.

Puddings were prepared from the resulting agglomerates with and without the fines (−20 mesh). The mesh analysis of the six products follows:

| Sample | Through 6 On 10 | Through 10 On 14 | Through 14 On 20 | Through 20 |
|---|---|---|---|---|
| 20-A | 35 | 26 | 27 | 12 |
| 20-B | 40 | 30 | 30 | 0 |
| 25-A | 31 | 10 | 50 | 9 |
| 25-B | 34 | 10 | 56 | 0 |
| 30-A | 16 | 24 | 44 | 16 |
| 30-B | 19 | 28 | 53 | 0 |

Recipe:
- 1 egg yolk
- 2 cups milk
- ¼ cup (30 grams) agglomerated tapioca
- ¼ cup sugar
- ⅛ teaspoon salt
- 1 egg white
- ½ teaspoon vanilla extract

*Procedure:*

Mix egg yolk with ½ cup of milk in saucepan. Add tapioca agglomerates, ⅓ cup of sugar, salt, and remaining milk (1½ cups). Bring to a full boil stirring constantly. Remove from fire. Beat egg white, adding remaining sugar (⅓ cup) gradually, until stiff but not dry. Fold hot tapioca mixture into egg white mixture. Allow to cool 15 minutes and stir in flavoring extract.

The finished puddings were all creamy, tender, and of excellent texture. The main purpose of allowing the puddings to cool before incorporating the flavoring extract was to provide for an additional stirring thereof and thus insure against settling. This additional stirring was found to be very helpful in preventing settling in the case of the puddings prepared from samples 25–B and 30—B but not at all necessary in the case of the puddings prepared from the other four samples.

Puddings were made in the same manner from each of samples 20–A and 20–B in admixture with coarser tapioca flake particles of the following mesh analysis:

|  | Percent |
|---|---|
| Through 10 on 14 | 50 |
| Through 14 on 20 | 50 |

In each case, these coarser flake particles constituted 33% by weight of the total mixture. The puddings were all of good consistency and generally acceptable from all points of view.

It is understood that the invention is in no way limited to the detailed procedures disclosed in the foregoing examples. For example, wide variations in the mesh analyses of the material to be agglomerated and resulting agglomerates may be encountered in practice without departing from the usefulness and advantages of the invention. Moreover, the invention may be applied to all starches having the physical properties naturally associated with tapioca, for example, the so-called "waxy" starches obtainable from certain hybrid varieties of corn and other cereals (mostly all other cereals with the exception of wheat). The invention should be regarded as being limited solely by the scope of the appended claims rather than by any details of the foregoing exposition.

What is claimed is:

1. The process of producing granular products from starch of the group consisting of tapioca and waxy starches for use in the preparation of puddings which comprises gelatinizing, drying and comminuting the starch into particles small enough to pass a 14-mesh screen, adding water to a mass of such particles and stirring the mass to cause the particles to unite into agglomerates, substantially less than the weight of the starch the amount of water being to avoid substantial swelling of the particles but being distributed on the surfaces of the particles to cause surface stickiness whereby porous agglomerates are formed, and then drying the porous agglomerates.

2. The process of producing granular products from starch of the group consisting of tapioca and waxy starches for use in the preparation of puddings which comprises gelatinizing, drying and comminuting the starch into particles small enough to pass a 14-mesh screen, adding between 20% and 35% water to a mass of such particles and distributing the water on the surfaces of the particles to cause surface stickiness and stirring the mass to form porous agglomerates, and drying the porous agglomerates.

3. The process of producing granular products from starch of the group consisting of tapioca and waxy starches for use in the preparation of puddings which comprises gelatinizing, drying and comminuting the starch into particles small enough to pass a 14-mesh screen, distributing a predetermined amount of water substantially uniformly over the surfaces of a mass of such particles to cause surface stickiness, the amount of water being substantially less than the weight of the starch to avoid substantial swelling of the particles, and stirring the mass to form porous agglomerates, and then drying the agglomerates.

4. The process of producing granular products from starch of the group consisting of tapioca and waxy starches for use in the preparation of puddings which comprises gelatinizing, drying and comminuting the starch into particles small enough to pass a 14-mesh screen, stirring a mass of such particles so as continuously to renew the surface of the mass while spraying said surface with water to cause surface stickiness of the particles, the amount of water being substantially less than the weight of the starch to avoid substantial swelling of the particles, whereby porous agglomerates are formed, and then drying the agglomerates.

5. The process of producing granular products from starch of the group consisting of tapioca and waxy starches for use in the preparation of puddings which comprises gelatinizing, drying and comminuting the starch into particles small enough to pass a 14-mesh screen, stirring a mass of such particles so as continuously to renew the surface of the mass while spraying said surface with water to cause surface stickiness of the particles, the amount of water being between 20% and 35% by weight of the mass, whereby porous agglomerates are formed, continuing the stirring after the addition of water has been completed to reduce the size of the agglomerates, and then drying the agglomerates.

6. The process of producing granular products from starch of the group consisting of tapioca and waxy starches for use in the preparation of puddings which comprises treating starch particles which have been gelatinized, dried and comminuted and are capable of passing through a 14-mesh screen by adding water to a mass of such particles and stirring the mass to cause the particles to unite into agglomerates, the amount of water being substantially less than the weight of the starch to avoid substantial swelling of the particles but being distributed on the surfaces of the particles to cause surface stickiness whereby porous agglomerates are formed, and then drying the porous agglomerates.

AKSEL G. OLSEN.

REFERENCES CITED

The following references are of record in the file of this patent:

UNITED STATES PATENTS

| Number | Name | Date |
|---|---|---|
| 1,035,829 | Anderson | Aug. 20, 1912 |
| 1,129,440 | Anderson | Feb. 23, 1915 |
| 2,098,293 | Jeffries | Nov. 9, 1937 |
| 2,177,378 | Schorn et al. | Oct. 24, 1939 |
| 2,178,235 | Lauterbach | Oct. 31, 1939 |

FOREIGN PATENTS

| Number | Country | Date |
|---|---|---|
| 16,997 | Great Britain | of 1913 |

OTHER REFERENCES

Ward, Encyclopedia of Food, pub. by Artemus Ward, 50 Union Sq., New York (1923), page 508,